United States Patent [19]

Christodoulou

[11] 4,444,553

[45] Apr. 24, 1984

[54] HEAT TREATING A PARTICULATE COMMODITY

[75] Inventor: Spyros D. Christodoulou, New Barnet, England

[73] Assignee: Din Engineering Limited, London, England

[21] Appl. No.: 368,066

[22] Filed: Apr. 13, 1982

[30] Foreign Application Priority Data

Apr. 16, 1981 [GB] United Kingdom ............... 8112190

[51] Int. Cl.³ .................... F27B 15/00; F27B 9/14; F27B 9/16; A23L 3/00
[52] U.S. Cl. .................................. 432/15; 99/443 C; 432/58; 432/134; 432/138
[58] Field of Search ............... 432/15, 58, 134, 139; 99/404, 447, 443 C; 426/467

[56] References Cited

U.S. PATENT DOCUMENTS

| | | | |
|---|---|---|---|
| 2,018,419 | 10/1935 | Richson | 99/404 |
| 2,439,780 | 4/1948 | Napier | 99/443 C |
| 2,456,124 | 12/1948 | Hoffman | 99/443 C |
| 2,517,833 | 8/1950 | Bourland | 99/443 C |
| 2,643,603 | 6/1953 | Balluteen | 99/104 |
| 2,732,789 | 1/1956 | Herberg | 99/404 |
| 4,154,574 | 5/1979 | Keirle et al. | 432/58 |

Primary Examiner—John J. Camby
Attorney, Agent, or Firm—Sughrue, Mion, Zinn, MacPeak & Seas

[57] ABSTRACT

Apparatus for heat treating a particulate commodity comprising an enclosure having a lower wall in the form of a concave, perforate deck, supply means for supplying pressurized fluid at a controlled temperature through the deck to fluidize and heat treat a bed of particles in the enclosure and transfer means for controlledly moving the particles continuously or stepwise along the deck. A method of heat treating the particulate commodity comprising supporting said commodity in a fluidized bed above a concave, perforate deck, supplying pressurized fluid at a controlled temperature through the deck to fluidize and heat treat the commodity, controlling the residence time of the commodity in the enclosure by controlledly moving the commodity along the deck using transfer means, and enhancing fluidization of the bed by reducing segregation within the bed using said transfer means. The commodity e.g. a food product such as peanuts is heat-treated uniformly under precisely controlled conditions.

12 Claims, 6 Drawing Figures

HEAT TREATING A PARTICULATE COMMODITY

BACKGROUND OF THE INVENTION

This invention relates to an apparatus for heat treating a particulate commodity which operates on the fluidised bed principle, and more particularly but not exclusively relates to apparatus for heat-treating particulate commodities such as food products. The invention also relates to a method of heat treating a particulate commodity.

Various types of apparatus are available for roasting food products such as nuts and coffee beans. The most common is a perforate, or sometimes a non-perforate, rotating drum which contains the product and to which heat is applied by means of open-flame burners. Internal paddles are fitted to the drum to stir the product during roasting. Such an apparatus is unsatisfactory for treating large quantities of product. First, it operates on a batch basis only; second, substantial degradation of the product occurs due to abrasion as the drum rotates; and third it depends highly on the experience of the operator to develop the right flavour and odour components.

Another known arrangement comprises a perforate, slowly rotating cylinder. The cylinder has a helical vane on its inner wall surface, the vane extending inwardly by about half the radius of the cylinder and its function being to move the product along the cylinder. Hot air is blown from above to pass through the cylinder and hence through the product bed, which becomes heaped up to cover one of the lower quadrants of the cylinder wall, because of the rotational motion. Such an apparatus does allow continuous, as opposed to batch processing, but tends to produce uneven roasting throughout the product which is heaped up against the cylinder wall into a bed varying in thickness. This bed presents less resistance to air flow in its thinner regions, and hence the product in such regions is roasted more highly. Other disadvantages include the need for careful positioning of sealing means adjacent the outer surface of the cylinder wall at the circumferential limits of the bed to ensure all the hot air introduced into the cylinder passes through the product bed without escaping through either side. Furthermore, in such an apparatus, degradation of the product occurs due to abrasion, leading to spoiling of the product and clogging of the perforations in the cylinder wall. The apparatus is also complicated because of the need for extraction means, arranged below the cylinder, to remove husks and broken parts of the particulate product.

In order to avoid such degradation, perforate continuous belt arrangements have been used in which hot air is blown through a perforated belt on which the product is supported. Although this apparatus avoids the problem of degradation and additionally operates on a continuous basis, it is still very difficult to achieve uniform roasting of the product particularly across the width of the belt. In addition, in order to prevent the perforated mesh belt from becoming clogged with oil released from the product, flames are played on the mesh belt during its return run. This this introduces a substantial fire risk because of loose particles such as nut husks which are blown through the recycled air.

In another apparatus using hot air to heat the product, the air is blown through the mesh sidewall of a vertical tower and the product is loaded into the tower at the top and passes downwardly through a system of baffles under gravity to be extracted from the base. In this arrangement, the air is blown through a filtering system attached to the mesh sidewalls. This results in the necessity for frequent cleaning of the filters to avoid impairing the performance of the oven. Furthermore, due to the heat gradient across the tower, the product tends to cook faster on the side adjacent the heat source and attempts to reduce the thickness of the tower to overcome this problem reduces the throughput capability of the apparatus.

A more satisfactory apparatus is one which, for part of its length, combines the principle of the fluidised bed with a rotary drum. In this equipment, heated air is injected into the interior of a rotary drum which is provided with a helical inner surface and a longitudinal channel through which the product is moved from one end to the other. The distribution of the surfaces within the chamber draws the product through the drum and relatively uniform roasting is achieved by the hot air which is injected into the product at the first, dehydration, stage and then into the space above the product at two subsequent roasting stages.

Despite the fluidised bed principle of operation of this apparatus, some degradation of the product does occur by abrasion, and the dust which is produced during rotation can clog the apparatus and oxidise to contaminate the final product. Furthermore, because the product is not fully fluidised, a relatively high temperature of about 240° C. is needed, with consequential high energy requirements. Conventional fluidised beds have been used for dehydrating food products, and they have a number of advantages compared with some other systems. With the particulate material in a fluidised condition, each particle is completely and continuously surrounded by a stream of drying or cooling relatively high velocity fluid, giving intimate contact between the solid particles and the fluid to reduce film resistance to evaporation and to ensure good heat transfer. In an ideally uniform gas-fluidised system, because of the high degree of solids mixing, there is a reduction of temperature gradients throughout the bulk of the bed to negligible values, i.e. the bed has a high effective internal thermal conductivity, and consequently all the particles theoretically receive the same heat treatment. If the particles have a range of sizes, the larger particles will tend to settle to the bottom of the bed, helped by a vibratory action of the deck along which the bed of particles is moved. Thus, the larger particles will be in the region of the higher velocity fluid, such as air, and heat transfer will be increased for these particles. Compared with other apparatus, due to the air stream, the particles suffer very little abrasion.

Nevertheless, a conventional fluidised bed does suffer, in practice, from the disadvantages of inconsistent results, due to difficulties in controlling conditions within the bed, such as the exact degree of heat applied to the bed along its length, and in controlling the dwell time of the product in a fluidised bed adapted for continuous processing of the product.

Although attempts to improve uniformity throughout the fluidised bed have been made by moving the fluidised particles along the bed using a conveyor belt to try and control the dwell time and/or stirring the particles to reduce segregation into stagnant areas and bubbles, the results have not been fully satisfactory. The conveyor belt has either hampered fluid flow to the bed and/or caused undue abrasion of the fluidised particles.

As a result of these difficulties, generally speaking, fluidised beds have been successfully used only for the dehydration stage of food products; they have not been successful for completing the entire roasting operation where precisely-controlled and consistent results are required. Yet a fluidised bed oven offers the advantage of cooking a product quickly, with a minimum loss of volatiles.

SUMMARY OF THE INVENTION

The present invention sets out to minimise the disadvantages of the known apparatus and methods.

The invention provides an apparatus for heat treating a particulate commodity, said apparatus comprising an enclosure defined in part by a lower wall comprising a concave, perforate deck; supply means for supplying pressurised fluid at a controlled temperature through said deck to the enclosure, whereby a bed of particles in the enclosure may be fluidised and heat treated; and transfer means at least partially disposed within said fluidised bed and operable to move the particles controlledly along said deck, either continuously or stepwise.

The apparatus according to the invention offers all the advantages of heat-treatment apparatus operating on the fluidised bed principle, and at the same time overcomes many of the disadvantages of existing fluidised bed systems.

For example, one of the main problems involved in the operation of orthodox fluidised bed ovens is uneven heat treatment of the product resulting from the difficulties in controlling the conditions within the bed. In particular, where a gas such as air is used as the fluidising medium, these inconsistencies can result from cavitation, or formation of gas bubbles, within the bed during operation, and it has been found that the use of transfer means which move the particulate commodity along the deck reduces non-uniformity in the distribution of these bubbles and prevents any large bubbles from forming. Similarly, any tendency of the bed of particles to channelling, i.e. void channels opening up in the bed by the upward fluid flow, is reduced by the transfer means. Preferably, these transfer means are also adapted to reduce segregation of the particles within the bed and prevent stagnant areas forming which would result in too much heat treatment being applied to certain portions of the commodity.

The use of a concave deck enables the bed of particles to be fluidised substantially over its entire cross-section and this provides much better conditions for fluidisation than a flat deck.

Furthermore, the most efficient heat transfer occurs at incipient fluidisation of the bed, i.e. when the bed is only just fluidised. An optimum fluid flow rate is achieved by balancing the requirements of a high flow rate for obtaining a good heat transfer coefficient and a low flow rate for conserving energy and for avoiding excessive particle velocities, which lead to uncontrollable particle motion as well as to degradation of the particles. The use of transfer means within the bed improves fluidisation to such an extent that conditions close to incipient fluidisation can be achieved; this allows a reduced gas velocity to be used with an equivalent energy saving, reduces the incidence of bubbles within the bed, and results in less degradation of the product being treated.

During heat treatment, optimum heat transfer is achieved by minimising the residence time of the particles in regions close to the deck. The use of transfer means enables this to be fulfilled much more readily and with lower gas flow rates.

A further advantage realised from the use of transfer means in the bed is that the residence time of the particulate commodity in the bed can be precisely controlled.

The transfer means may comprise wall means movable relative to said deck, said wall means being operable to compartmentalise said enclosure into compartments open towards said deck, whereby particles in each compartment can be substantially fully fluidised while the transfer means move the particles continuously or stepwise along the deck.

Advantageously, the deck may be substantially part-cylindrical. In this case, the transfer means suitably comprise a rotary element, such as a screw conveyor, having its axis coincident with the axis of the deck. Preferably, the external diameter of the flight of the screw conveyor is substantially twice the radius of curvature of the deck and a minimal clearance is allowed between the flight of the conveyor and the deck surface. This ensures that all the particulate commodity, including particles in those regions close to the deck, is entrained by the conveyor. The precise distance of the conveyor flight from the deck is not critical, however, as the upward flow of the air or other fluidising medium immediately frees any particles trapped between the flight and deck, enabling them to be then conveyed along the deck by the flight.

Suitably, vibratory means are provided to vibrate the deck vertically or with a vertical component, in order to enhance further the fluidisation of the particles in the bed.

The particulate commodity which is subjected to the heat treatment may be capable of fluidisation, in which case the bed of particles in the enclosure comprises the particulate commodity itself. This is generally the case where small particulate food products such as peanuts, coffee beans, barley or dessicated coconut are being treated. Where the particulate commodity cannot readily be fluidised, then the bed of particles suitably comprises a carrier bed, and the particulate commodity is supported and treated in this bed. Where the commodity is a food product (e.g. large nuts) the carrier bed is preferably formed from a non-toxic food quality material of fine particulate form.

Where a carrier bed is used, the transfer means are adapted to transfer the particulate commodity along the deck without removing the particles making up the carrier bed. This can be achieved by using a transfer means such as a screw conveyor with a perforated or open-work flight, the perforations being of such a size that the material of the carrier bed passes easily through them, but the individual particles of the particulate commodity do not pass therethrough. In this way, the particulate commodity is entrained along the deck, without the carrier particles. With this arrangement, means are provided for removing the commodity from the end of the deck, and these suitably comprise a rotatable, perforate scoop mounted on the screw conveyor shaft. The scoop is angled to collect the commodity at the end of the deck and to tip it over a weir, or through an opening, out of the enclosure.

In an alternative arrangement to a screw conveyor, the rotary element comprising the transfer means comprises a rotatable shaft having a succession of discs disposed at intervals therealong, each disc being provided with an aperture in its periphery and adjacent discs being interconnected by angled vanes which extend from the aperture in the periphery of one disc to the opposite wall of the adjacent disc. On rotation of the shaft, each vane collects particulate commodity from the compartment defined between two adjacent discs and moves it to the space between the next pair of adjacent discs, thus transferring the particulate commodity stepwise along the deck. Preferably, as with the screw conveyor, the diameter of the discs is substantially twice the radius of curvature of the concave deck and a minimal clearance is allowed between the discs and the deck surface.

The above arrangement is in some circumstances preferred to a screw conveyor; for instance the parallel discs improve the vertical fluidisation of the bed, and any tumbling action is reduced, thereby minimising degradation of the particulate material. This arrangement gives a stepwise, rather than continuous, transfer of commodity along the deck.

The apertures may be rotationally staggered with respect to the aperture in the adjacent disc or discs, so that the apertures lie on a helix. As a result of this arrangement, when the rotary element turns, not all the commodity is shifted at once along the deck, but only the particles in one compartment at a time. In this way, the pressure of the fluid supplied to the bed is not disturbed, so that the volume, and hence temperature of the fluid supply remains substantially constant.

In order to reduce the heat demands of the fluidised bed, the transfer means may be designed to retain heat. For example, they may be made from a heavy metal material having a high heat capacity.

Generally speaking, there are three individual stages involved in the heat-treatment of food products such as coffee beans, nuts or dessicated coconut. The first state is dehydration, in which the applied heat forces out the water content of the product; the second stage is generally known as "heat treatment" and at this stage the product is cooked to a certain extent (and generally turned a plale shade of brown) but the flavour is not developed. The third and final stage is known as roasting and it is at this stage that the flavour is developed and part of the oil content of the product is forced out by the high temperature employed. The requirements for the heat treatment of the product at each of these stages are different, and in order to cater for this, in an advantageous embodiment of the invention, the apparatus includes means for varying the environmental conditions within the fluidised bed longitudinally of the deck. Thus, corrent conditions may be provided for each of the three stages in roasting a food product such as nuts or coffee beans. Alternatively, where wet or tacky products are being treated, it may be desirable to supply the fluid, such as air, at a higher pressure in an initial zone along the deck so as to separate and loosen the product ready for the subsequent stages.

Preferably, this is achieved by providing two or more heat treatment zones longitudinally of the deck, although the conditions may change gradually along the deck for certain applications.

Suitably, the means for varying the conditions comprise a plenum chamber located beneath the perforated deck, which plenum chamber incorporates manifold means directing different fluid flow conditions to different parts of the deck. Control means are provided operable to vary these fluid flow conditions whereby the temperature, pressure and/or quantity of the fluid can be differentiated in the various zones. For example, where the apparatus is intended for the heat treatment of nuts of coffee beans, manifold means operable to direct three separate gas flows into the fluidised bed enclosure may be provided, and the control means are operable to adjust the temperature of these gas flows to correspond to the three cooking phases of dehydration, heat treatment and roasting. An additional cooling zone may be provided at the downstream end of the deck.

Alternatively, or in addition, the control means can provide increased fluid flow rates and higher fluid pressures in the first zone of the bed. This is an alternative way of setting the gas temperature. It is also particularly effective where a wet or sticky product is being treated, as the increased fluid flow helps to break up the conglomerated product as it enters the enclosure. The fluid flow is reduced in the following zones to provent degradation.

The fluidised bed deck may be designed to provide optimum conditions for even fluidisation across the deck during operation. This can be achieved by varying the sizes of the perforations in the deck as appropriate; for example, the lowest regions of the concave deck are suitably provided with larger holes than the upper regions, thereby providing enhanced fluidisation over the full width of the bed.

In a further alternative embodiment, instead of the deck having uniformly sized perforations throughout, occasional larger perforations may be provided to enable conglomerated particulate commodity to be broken up by the increased fluid flow through those larger perforations.

The invention also provides a method of heat treating a particulate commodity comprising supporting said commodity in a fluidised bed maintained above a concave perforate deck; supplying fluid under pressure to the bed through the perforations in the deck at a controlled temperature whereby the bed is fluidised and the particulate commodity is heat treated; controlling the residence time of the particulate commodity in the bed by moving controlledly the particles along the deck using transfer means disposed at least partially in the bed; and enhancing the conditions of fluidisation within the bed by substantially eliminating stagnant areas and reducing bubble formation using said transfer means.

In one embodiment of the method according to the invention, the particulate commodity is itself fluidised; in another embodiment, the commodity is supported in a carrier bed of particulate material. The particulate carrier bed for particulate commodity comprising a food product is a non-toxic food quality material.

Suitably, the method includes controlling the environment within said enclosure whereby a succession of heat treatment zones are provided longitudinally of the deck.

In one form of the invention, the fluid supplied under pressure to the bed through the perforations comprises a liquid cooking medium, preferably oil. In this arrangement, the oil is used to fry the particulate food product.

DESCRIPTION OF THE PREFERRED EMBODIMENTS

Figure 1:
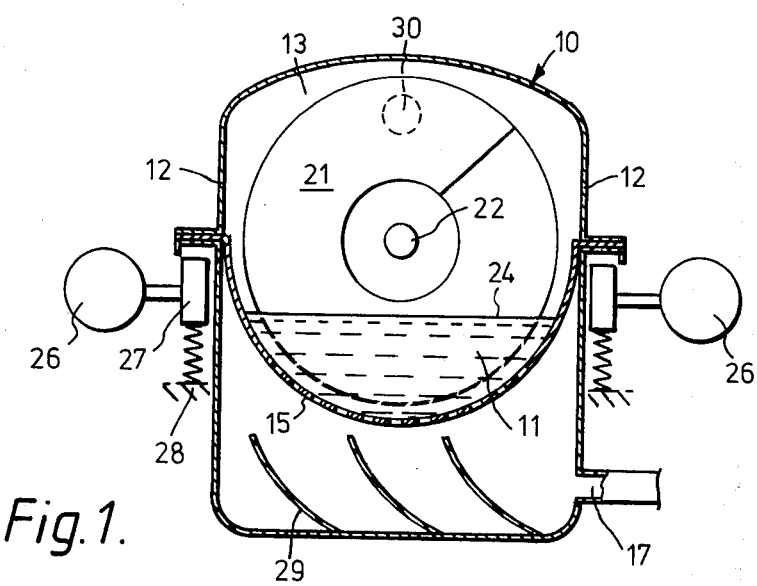
FIG. 1 is a transverse section through an apparatus according to one embodiment of the invention for heat treating a particulate commodity.

Referring to FIGS. 1 to 4 of the drawings, FIG. 1 shows a transverse cross-section through an apparatus for the heat treatment of a particulate commodity.

The apparatus operates on the fluidised bed principle and comprises an enclosure 10 having side walls 12, end walls 13 and a lower wall comprising a concave perforated deck 15, which is suitably semi-cylindrical, suspended between the side walls 12. The deck 15 is perforated to allow entry of a pressurised fluid, such as air, into the space within the enclosure 10 above the deck 15. The deck 15 supports the fluidised bed 11 of particles. The perforations in the deck may increase in size gradually towards the centre of the deck 15, the perforations being smaller towards the deck edges. This compensates for the variation in depth of the bed across its width and promotes even fluidisation across the width of the bed. However, quite satisfactory results are achieved if all the perforations are the same size, which has the advantage of simplicity in manufacturing the deck.

Preferably, there are the occasional larger perforations in a deck having otherwise uniformly sized perforations. This helps break up any conglomerations of particles.

Figure 3:
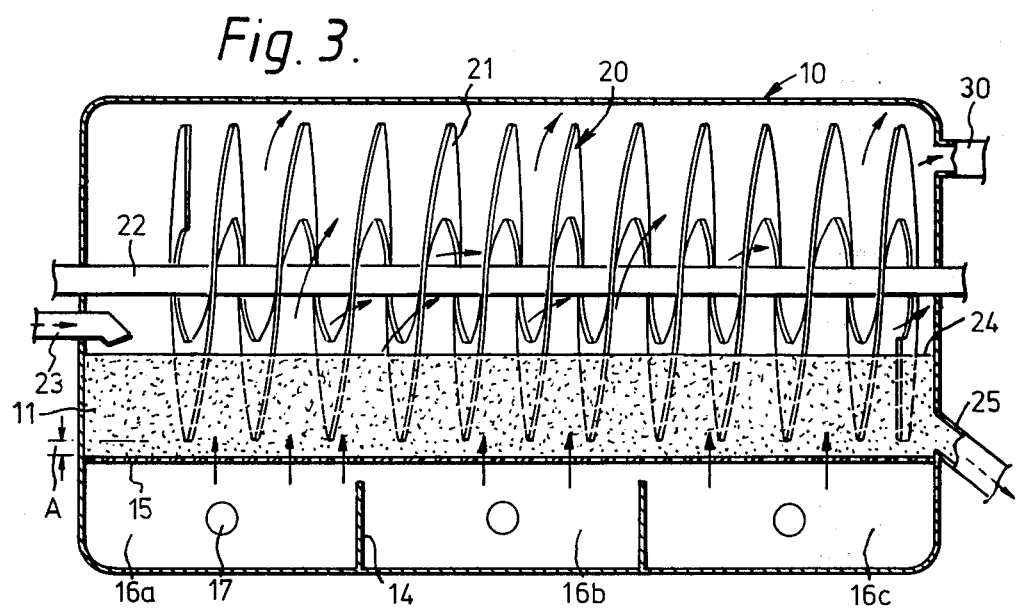
FIG. 3 is a longitudinal cross-sectional view of the apparatus shown in FIG. 1 and FIG. 2.
Figure 2:
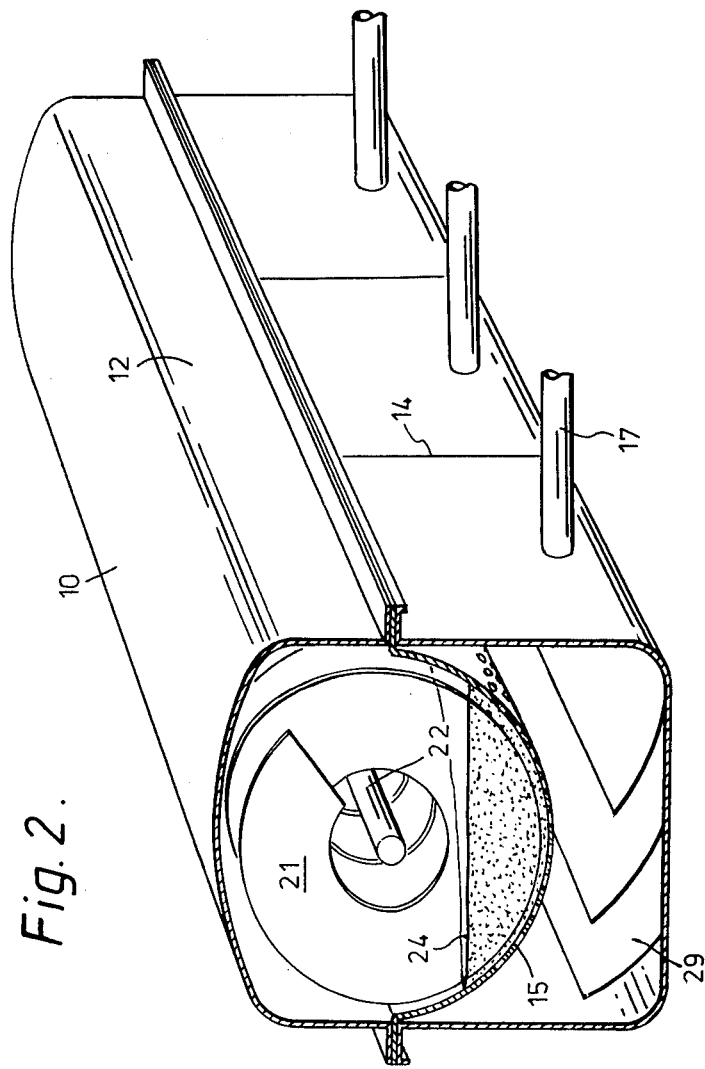
FIG. 2 is a perspective view of the apparatus shown in FIG. 1.

As can be seen from FIGS. 1 and 3 of the drawings, the perforations are only part way up the deck of the bed 11. This ensures steady, non-excessive fluidisation of the bed.

The bed 11 may comprise solely the particulate commodity itself or, for a particulate commodity which is not readily fluidised, for instance large nuts, the bed 11 may comprise the commodity in a carrier bed. In either case, the particulate commodity is admitted to the enclosure 10 through an inlet 23 and, after passing along the deck 15, leaves the enclosure through an outlet 25. The enclosure is illustrated as being substantially closed since, in this embodiment, the fluid entering the enclosure 10 through the deck 15 is collected for recycling after cleaning. However, the enclosure 10 could instead be open if re-cycling or fluid collection to avoid pollution were not required.

Disposed below the deck 15 is a plenum chamber which may be a single chamber or, as shown, may be divided by transverse walls 14 into a series of plenum chambers, where zones having different environmental conditions are to be provided in the enclosure 10. In the illustrated embodiment, there is a series of three plenum chambers 16a, 16b and 16c. Each plenum chamber is supplied through an inlet pipe 17 with pressurised, high temperature air from a common manifold 18. Each inlet pipe houses a gate valve or a butterfly valve (not shown) which individually controls the flow of air admitted to each plenum chamber. Vanes 29 within each plenum chamber deflect the incoming air to ensure a more even air supply across the width of the deck 15. Each of these plenum chambers serves a zone or region, 10a, 10b or 10c in the enclosure 10 above the deck 15 and above the respective plenum chamber 16a, 16b or 16c. The boundaries of these zones are not strictly defined.

A further, cooling, zone 10d (shown in FIG. 4 only) may be provided at the downstream end of the enclosure 10. The cooling zone 10d is partitioned from the rest of the enclosure by a transverse wall 14' extending between the side walls 12 above the deck 15. This zone has a separate, ambient temperature, pressurised air supply via manifold 19.

A series of parallel, transversely extending upright panels (not shown) are disposed to support the deck 15, and these have the added advantage of ensuring that the air is supplied to the deck, from manifolds 18 and 19, in a substantially vertical direction.

During operation, the particulate commodity being treated in the apparatus is maintained in a fluidised state by the pressurised air fed through the perforations in the deck 15. In order to improve fluidisation, the enclosure 10 is vibrated by means such as out-of-balance motors 26, (FIG. 1) acting on longitudinal supports 27 for the enclosure 10, which supports 27 are resiliently mounted on a base 28. The vibration rate is approximately 1,000 cycles per minute and the vibrations have a vertical component which contributes to a significant part of the total fluidisation. The level attained by the fluidised bed 11, is indicated by 24.

In practice, to prevent a transverse horizontal component of vibration, a transverse bar (not shown) extends between the two motors 26 to join them rigidly together. The vane of the transfer means being used is discontinuous to allow the bar to extend across the enclosure and the gap where the vane is discontinuous is greater, so that the level of the bed drops below the bar at this point in the enclosure. The bar thus does not interfere with the smooth passage of the commodity along the deck.

The particulate commodity is moved along the deck 15 by transfer means which, in this embodiment, comprises a rotary element in the form of a screw conveyor 20 comprising an open-centered helical flight 21 mounted by means of spokes (not shown) on a rotatable shaft 22. The shaft is disposed with its axis concentric with the axis of the part-cylindrical deck 15, and its ends protrude beyond the end walls 13 of the enclosure 10. The shaft 22 is rotatably mounted at either end, and one of the ends meshes with a gear motor which drives the shaft and is able to control accurately its rotational speed.

The outer edge of the helical flight 21 is spaced from the semi-cylindrical deck by a distance A. The value of A depends on the particulate commodity being processed and is roughly just under half the width of the particles. The clearance of the flight 21 from the deck supporting the fluidised bed is fairly important, as too large a value would cause damage of the particles which would be caught and crushed between the flight 21 and the deck 15, while too small a value would impose inordinately close tolerances on the apparatus. The combination of the particles being fluidised and choosing a suitable value for A ensures that no particles are trapped and crushed between the flight and the deck. However, there is not a tendency for particles to become trapped, as they are fluidised and tend to jump free of the flight if they come into contact with it.

In the case where a cooling zone 10d is provided, there is a break in the flight 21 to accommodate the transverse wall 14' separating zone 10d from the rest of the enclosure.

The flight 21 is open-centered to assist the air which has passed through the fluidised bed to pass along the enclosure and to be exhausted from the enclosure 10 through a vent 30. Instead, or in addition to, being open-centred, the flight 21 may be an open-work or be perforated, to enhance air circulation through the whole of that part of the bed 11 in each zone 10a, 10b, 10c, 10d.

Figure 4:
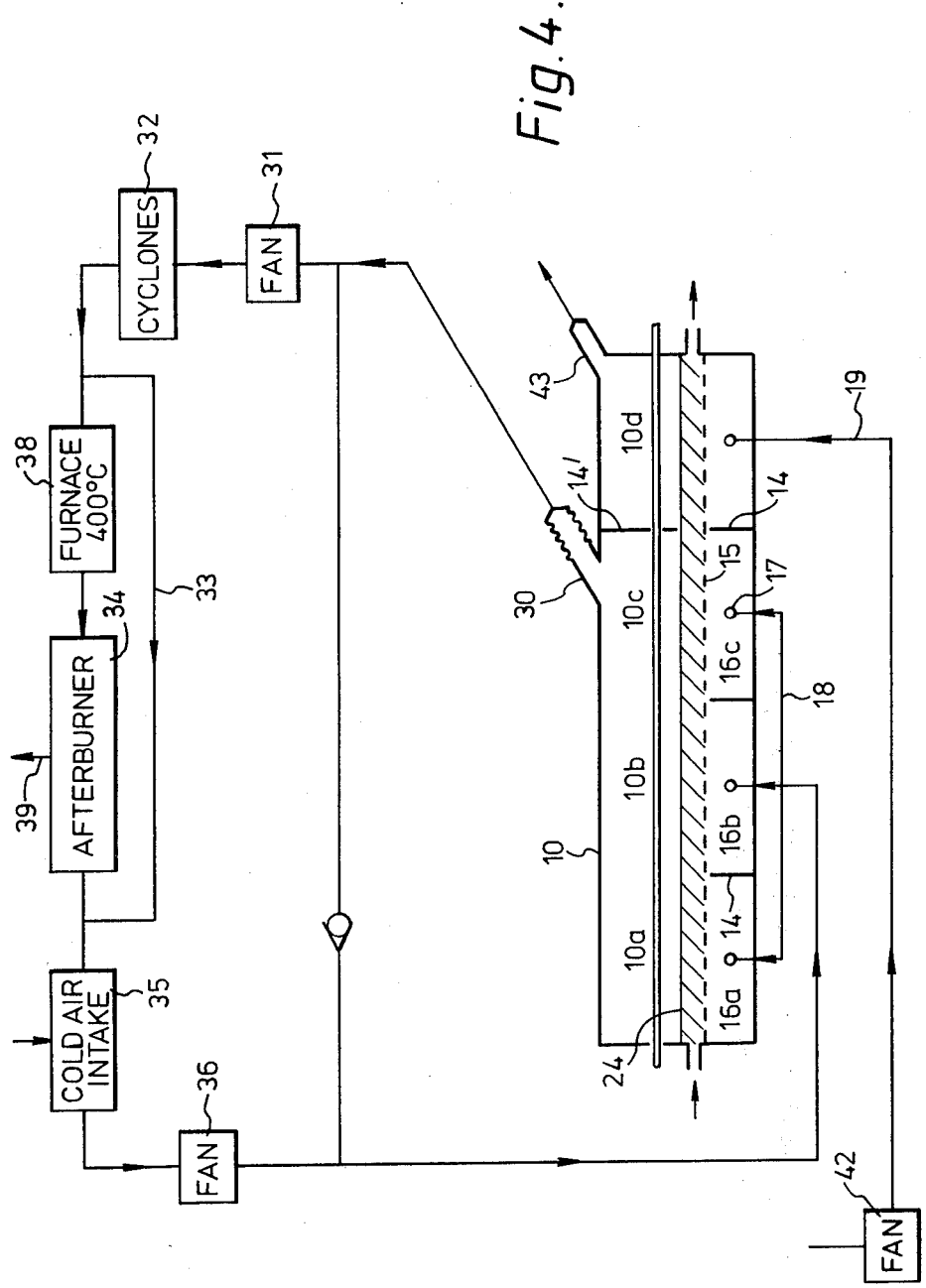
FIG. 4 is a longitudinal cross-section through the apparatus of FIGS. 1 to 3, but also showing a cooling zone and a fluid supply and circulation system.

The air passing through the three zones 10a, 10b and 10c is removed and passes through a common extract vent 30 which is connected to an extract fan 31 (FIG. 4). In order to save heat energy, this air is recycled through the apparatus, but, due to the presence of small particles, dust and husks, it must first be cleaned in a series of cyclones 32 before being passed to an air heater which may, for example, be a direct ignition device such as a gas burner 38. Some of the air from the cyclones is passed into the burner 38 and some by-passes the burner via conduit 33; the air passing through the burner 38 may be incinerated in an after-burner 34 to remove noxious fumes. Some of the air from the after-burner 34 is discharged to exhaust at 39, but the remainder, together with the by-passed air from conduit 33 is then passed to a direct heat exchanger 35 where it is mixed with fresh air so that the correct temperature is achieved. Fan 36 then passes the air under pressure to manifold 18.

A separate fan 42 supplies the fresh air for the cooling zone 10d, and this is removed via a separate vent 43.

The manifolds 18 and 19 are suitably made from a flexible plastics material such as TEFLON (Registered Trade Mark) so that they are insulated from the vibrations applied to the deck 15. Vent 30 is connected into the exhaust line by a flexible connection for the same reason.

The particulate commodity, nuts, coffee beans etc., to be treated is loaded, via inlet 23, onto one end of the deck 15, where it immediately becomes fluidised and heated by the high temperature air passing through the perforations in the deck 15; the shape of the deck promotes controlled and substantially uniform fluidisation across the width of the deck.

The screw element 20 is rotated to transfer, in a controlled manner, the fluidised commodity along the deck 15. As well as its rotational speed being controllable, the flight 21 of the screw conveyor 20 itself imposes, by the nature of its shape, considerable control on the bed 11. The pitch of the helical flight 21 is chosen so that adjacent portions of the flight are spaced to reduce turbulence within the bed.

The time spent by the material passing through the enclosure, i.e. the dwell time, is pre-selected to a high degree of accuracy by setting the desired rotational speed of the screw conveyor.

In addition to control of the dwell time, the conditions in each zone may be controlled separately to match the requirements of the particular product being treated, though this is not necessary. In the apparatus shown in FIG. 1, zones 10a, 10b, and 10c are heating zones, while the last zone 10d is a cooling zone. High-temperature air is supplied to the first three zones via the manifold 18, and the gate valves in the inlet pipes 17 are set to control the amount of air admitted to each zone. For treating peanuts, say, zone 10a carries out dehydration of the product at a temperature of around 100° C. by suitable setting of the valve controlling air flow to plenum chamber 16a and hence to zone 10a. In zone 10b, larger quantities of air are admitted so that "golden" roasting of the product is achieved by the time the product reaches the end of this zone. Temperatures achieved in zone 10b are around 180° C. In zone 10c, which is the last of the cooking zones, the amount of air admitted by the valve controlling plenum chamber 16c is adjusted so that the highest temperatures are reached in this zone, for example temperatures of up to 210° C. may be achieved in zone 10c. Zone 10d is a cooling zone in which air at ambient temperature is injected via plenum chamber 16d and manifold 19.

Instead of controlling relative air flow and hence air temperature to each plenum chamber, it is possible to provide the capability of supplying air at all the same flow rates, but at different temperatures to zones 10a, 10b and 10c.

It will be appreciated that the use of up to four separate fluidised bed zones for treating the product ensures a hitherto unobtainable consistency in the results which are achieved. In particular, it is possible to control the rate at which the product passes through the zones by controlling the rotation of screw conveyor 20 and the temperatures attained in each of the zones may be predetermined. In addition, means (not shown) may also be provided for separately introducing cooling air into each zone for further temperature control in the zones.

Virtually no abrasion of the product takes place during its passage through the apparatus because the product is fluidised, so that the product particles do not rub one another or the apparatus, and because this particular choice of transfer means inflicts little damage.

Figure 5:
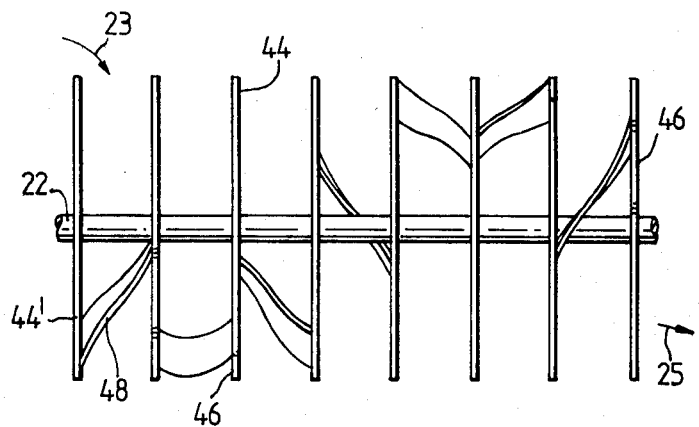
FIG. 5 is a side elevation of transfer means according to a second embodiment of the invention.
Figure 6:
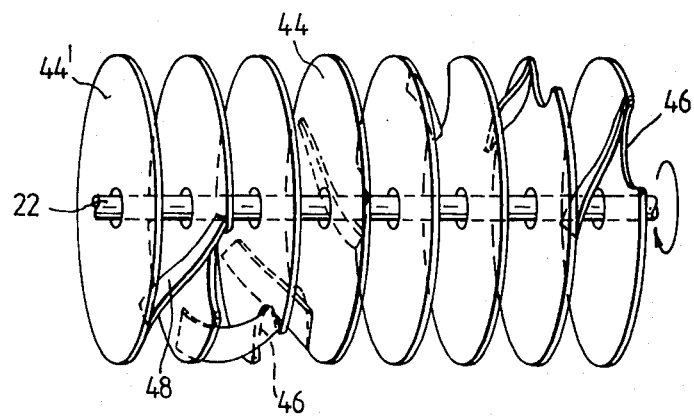
FIG. 6 is a perspective view of the transfer means shown in FIG. 5.

In an alternative embodiment, illustrated by FIGS. 5 and 6, the transfer means, instead of comprising a screw conveyor, comprises a rotary element including a rotatable shaft 22 provided with a series of spaced, radial discs 44.

Each of the discs 44 has in its periphery an aperture 46 and adjacent discs are interconnected by a vane 48, angled relative to the axis of the shaft 22. The particulate commodity is moved from the space between two adjacent discs 44 by means of the angled vane 48 which extends between those two discs, the vane sweeping the commodity from the compartment defined between those two discs through the aperture 46 of the downstream disc of the pair to the compartment between the next pair of adjacent discs. The apertures 46 in adjacent discs are rotationally staggered and thus lie on a helix, so that only the commodity in one compartment at a time is moved along the deck. This helps the fluid pressure in the bed to remain steady. The particles are introduced into the bed between the first pair of discs, and apertures 46 are therefore omitted from the first disc 44'. The spacing of discs 44 is selected in dependence on the size of particles to be treated, a greater spacing being used for larger-sized particles.

The discs 44 may be perforated (not shown) to enhance free circulation of air. This encourages even heat treatment throughout the whole bed 11 (or throughout the whole of that part of the bed in each zone of the enclosure, if zones be present).

The parallel-disc transfer device illustrated in FIGS. 5 and 6 is intended to be disposed concentrically with a perforate deck 15 of part-circular section similar to that of the embodiment shown in FIGS. 1 to 4, the discs 44 having a radius substantially equal to the radius of curvature of the deck 15. There is minimum clearance of the discs from the deck and, because there is no relative movement of the discs 44 along the deck 15, as there is between the flight 21 of the screw conveyor and the deck 15, the periphery of each disc is knife-edged (FIG.

5) to reduce the likelihood of particles being trapped between the outer edge of discs 44 and the deck 15.

Such transfer means have certain advantages over a screw conveyor. The parallel discs enhance fluidisation by presenting less obstruction to the vertically flowing air and there is less tumbling, and hence less degradation, of the particulate commodity. A choice of transfer means will depend on the type of product being treated and on the type of heat treatment to be given to the commodity. The helical screw conveyor is most suitable for transferring along the deck particles which are dry and more freely relative to one another, while the parallel-disc conveyor is preferred for the transfer of particles which do not move relative to one another so readily.

Where the enclosure is effectively divided into zones providing differing heat treatments, a better definition of these zones can be achieved by using the parallel-disc conveyor in preference to the screw conveyor. The spacing of the discs would be selected so that a disc is arranged in the plane of and above each transverse wall dividing up the space below the deck into a series of plenum chambers.

The material from which the transfer means is made may have a high heat capacity, so that it tends to retain heat and helps to provide a uniform heat distribution throughout the particulate commodity being treated.

The bed is fluidised by pressurised air, and fluidisation is preferably enhanced by vibrations having a vertical component acting on the deck. Fluidisation may be further enhanced by the provision of mechanical stirring means.

In the case of the parallel-disc conveyor, such stirring means are conveniently provided in the form of radially extending stirring fingers (not shown) disposed on the shaft between the discs 44.

As mentioned above, the fluidised bed may comprise either the particulate commodity alone, if it is itself capable of fluidisation, or it may comprise the commodity in a carrier bed of relatively fine particles if the commodity particles are large and therefore less readily fluidised. Where the commodity is a food product, the carrier bed is suitably also edible and may, for instance, comprise semolina, flour or cocoa powder. If the fluidised bed does include such a carrier bed, suitably some means of preferential transfer of the commodity rather than the carrier bed is provided. For instance, the flight of the screw conveyor or the angled vane of the parallel-disc conveyor may be of open-work construction, its interstices being of a size selected to sieve therethrough the particles of the carrier bed but to entrain and therefore transfer along the deck the commodity particles. Also, unless the carrier bed particles are to be recycled, separating means are provided at the downstream end of the enclosure so that the commodity is removed from the bed after treatment therein whilst leaving behind the carrier bed. A perforated scoop, comprising an angled plate may be disposed on the downstream end of the shaft 22 of either the screw conveyor or the parallel-disc conveyor for this purpose.

Although the fluid described so far has comprised air, other fluids may be used such as a liquid cooking medium edible oil for instance. The oil may be used to fry the particulate commodity such as nuts. In this case, the oil is preferably collected for cleaning and recycling by allowing it to flow over a weir arrangement, or through an outlet, at the downstream end of the enclosure. Alternatively, if it is desired to treat the product by freezing (e.g. for freeze-drying) a low temperature fluid such as liquid nitrogen may be used for fluidisation.

Although the embodiments described utilise a multi-zone fluidised bed arrangement, it will be appreciated that in some circumstances a single treatment zone will be sufficient to give the desired results. In such an arrangement, substantially constant conditions will be maintained along the length of the fluidised bed.

What is claimed is:

1. An apparatus for heat treating a particulate commodity, said apparatus comprising:
   (i) an enclosure defined in part by a lower wall comprising a concave perforate deck;
   (ii) supply means for supplying fluid under pressure through the perforate deck to said enclosure;
   (iii) temperature control means for controlling a temperature of said fluid supply under pressure through the perforate deck, whereby a bed of particles in said enclosure can be fluidised and heat treated;
   (iv) transfer means disposed during fluidisation at least partially within the bed and operable to controlledly move said particles continuously or stepwise along said deck,
      said transfer means being adapted to control a dwell time of the particles in said enclosure while simultaneously improving conditions of fluidisation within the bed by substantially eliminating stagnant areas and reducing bubble formation; and
   (v) vibratory means operable to vibrate the deck with a component of vertical motion, whereby fluidisation of the particle bed is further enhanced.

2. An apparatus according to claim 1, wherein said transfer means comprises wall means moveable relative to said deck, said wall means being operable to compartmentalise said enclosure into compartments open towards said deck, whereby particles in each compartment can be substantially fully fluidised while the transfer means move the particles continuously or stepwise along the deck.

3. An apparatus according to claim 2, wherein said concave deck is part-cylindrical and said transfer means comprises a rotary element including a shaft coaxial with said deck, and further includes at least one vane rotationally secure with said shaft, said vane being operable to act as said wall means.

4. An apparatus according to claim 3, wherein said rotary element comprises a screw conveyor, said at least one vane comprising a helical flight, the external diameter of said flight being substantially equal to twice a radius of curvature of said deck, whereby, on rotation of said rotary element, the particles are transferred continuously along the deck.

5. An apparatus according to claim 3, wherein said vanes of said rotary element comprise a plurality of substantially parallel discs extending radially from said axle, the radius of said discs being substantially equal to the radius of curvature of said deck, an aperture being disposed in the periphery of each said disc, said rotary element further comprising conveying means extending between at least one pair of adjacent discs to a location adjacent said aperture, whereby, on rotation of said rotary element, particles in said compartment between said adjacent discs are conveyed through said aperture, thus transferring the particles stepwise along the deck.

6. An apparatus according to claim 3, wherein said at least one vane is perforated and transfers preferentially along the deck a particulate commodity supported in a carrier bed of said particles.

7. An apparatus according to claim 1, wherein said deck comprises a plurality of environmentally separate regions arranged longitudinally of said deck, said supply means separately supplying fluid under pressure to each of said separate deck regions, a plurality of heat treatment zones within said enclosure being disposed above corresponding said regions of the deck, whereby said supply means are operable to control separately the environment within each said heat treatment zone.

8. A method of heat treating a particulate commodity, said method comprising the steps of:
  (i) supporting said commodity in a fluidised bed maintained above a concave perforate deck;
  (ii) supplying fluid under pressure to the bed through perforations in the deck at a controlled temperature whereby the bed is fluidised and the particulate commodity is heat treated;
  (iii) controlling the residence time of the particulate commodity in the bed by controlledly moving the particles along the deck using transfer means disposed at least partially in the bed;
  (v) vibrating the deck with a vertical component of vibratory motion; and
  (v) enhancing the conditions of fluidisation within the bed by substantially eliminating stagnant areas and reducing bubble formation using both said transfer means and said vibration of the deck.

9. A method according to claim 8, wherein said particulate commodity is itself fluidised.

10. A method according to claim 8, wherein said bed comprises the particulate commodity supported in a carrier bed of finer particles which are fluidised.

11. A method according to claim 8, further comprising the step of controlling the environment within said enclosure whereby a succession of heat treatment zones are provided longitudinally of the deck.

12. A method according to claim 8, wherein said particulate commodity is a food product and the fluid supplied under pressure comprises a liquid cooking medium, whereby the food product is fried.

* * * * *

REEXAMINATION CERTIFICATE (1209th)
United States Patent [19]
Christodoulou

[11] B1 4,444,553
[45] Certificate Issued Feb. 27, 1990

[54] HEAT TREATING A PARTICULATE COMMODITY

[75] Inventor: Spyros D. Christodoulou, New Barnet, England

[73] Assignee: Din Engineering Limited, London, England

Reexamination Request:
No. 90/001,740, Mar. 31, 1989

Reexamination Certificate for:
Patent No.: 4,444,553
Issued: Apr. 24, 1984
Appl. No.: 368,066
Filed: Apr. 13, 1982

[30] Foreign Application Priority Data

Apr. 16, 1981 [GB] United Kingdom ............... 8112190

[51] Int. Cl.$^4$ .................. F27B 15/00; F27B 9/14; F27B 9/16; A23L 3/00
[52] U.S. Cl. .................................... 432/15; 432/58; 432/134; 432/138; 99/443 C
[58] Field of Search .................... 432/15, 58, 134, 138, 432/139; 99/443 C

[56] References Cited

U.S. PATENT DOCUMENTS

| | | |
|---|---|---|
| 2,018,419 | 10/1935 | Richeson . |
| 2,316,664 | 4/1943 | Brassert et al. . |
| 2,439,780 | 4/1948 | Napier . |
| 2,456,124 | 8/1943 | Hoffman . |
| 2,517,833 | 8/1950 | Bourland . |
| 2,643,603 | 6/1953 | Balluteen . |
| 2,716,936 | 9/1955 | Kopf . |
| 2,732,789 | 1/1956 | Herberg . |
| 3,572,235 | 3/1971 | Nutting et al. . |
| 4,154,574 | 5/1979 | Keirle et al. . |
| 4,169,164 | 9/1979 | Hubbard et al. . |

FOREIGN PATENT DOCUMENTS

| | | |
|---|---|---|
| 737962 | 6/1946 | Fed. Rep. of Germany . |
| 1009005 | 5/1957 | Fed. Rep. of Germany . |
| 1010460 | 6/1957 | Fed. Rep. of Germany . |
| 1269597 | 6/1968 | Fed. Rep. of Germany . |
| 2236613 | 8/1975 | Fed. Rep. of Germany . |
| 2146615 | 2/1976 | Fed. Rep. of Germany . |
| 2531390 | 5/1976 | Fed. Rep. of Germany . |
| 56478 | 6/1987 | Fed. Rep. of Germany . |
| 2121722 | 1/1972 | France . |
| 2434580 | 3/1980 | France . |
| 714037 | 8/1954 | United Kingdom . |
| 759663 | 10/1956 | United Kingdom . |
| 896173 | 5/1962 | United Kingdom . |
| 983953 | 2/1965 | United Kingdom . |
| 1089190 | 11/1967 | United Kingdom . |
| 1240405 | 7/1971 | United Kingdom . |
| 1253649 | 11/1971 | United Kingdom . |
| 1256624 | 12/1971 | United Kingdom . |
| 1267397 | 3/1972 | United Kingdom . |
| 1498206 | 11/1975 | United Kingdom . |
| 1477493 | 6/1977 | United Kingdom . |
| 2053714 | 2/1981 | United Kingdom . |
| 2003396 | 3/1982 | United Kingdom . |

*Primary Examiner*—Henry C. Yuen
*Attorney, Agent, or Firm*—Roger W. Parkhurst; James A. Oliff; William P. Berridge

[57] ABSTRACT

Apparatus for heat treating a particulate commodity comprising an enclosure having a lower wall in the form of a concave, perforate deck, supply means for supplying pressurized fluid at a controlled temperature through the deck to fluidize and heat treat a bed of particles in the enclosure and transfer means for controlledly moving the particles continuously or stepwise along the deck. A method of heat treating the particulate commodity comprising supporting said commodity in a fluidized bed above a concave, perforate deck, supplying pressurized fluid at a controlled temperature through the deck to fluidize and heat treat the commodity, controlling the residence time of the commodity in the enclosure by controlledly moving the commodity along the deck using transfer means, and enhancing fluidization of the bed by reducing segregation within the bed using said transfer means. The commodity e.g. a food product such as peanuts is heat-treated uniformly under precisely controlled conditions.

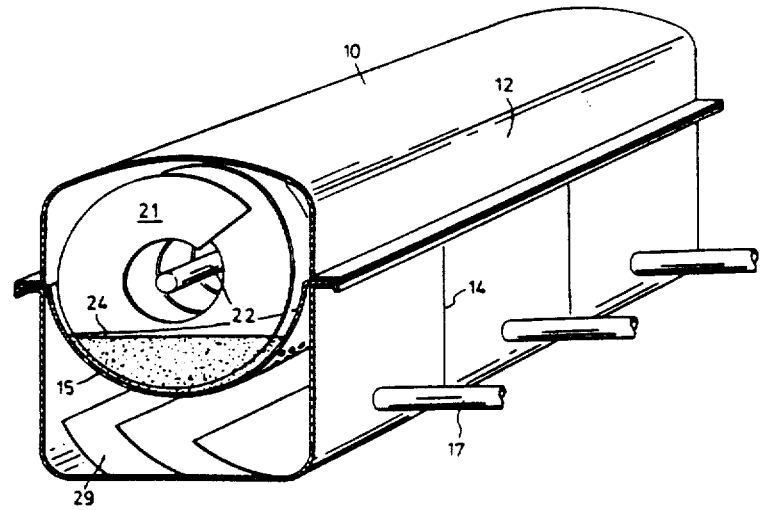

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 5 is cancelled.

Claims 1, 3, 4 and 8 are determined to be patentable as amended.

Claims 2, 6, 7 and 9–12, dependent on an amended claim, are determined to be patentable.

New claims 13 and 14 are added and determined to be patentable.

1. An apparatus for heat treating a particulate commodity, said apparatus comprising:
   (i) an enclosure defined in part by a lower wall comprising a concave perforate deck;
   (ii) supply means for supplying fluid under pressure through the perforate deck to said enclosure;
   (iii) temperature control means for controlling a temperature of said fluid supply under pressure through the perforate deck, whereby a bed of particles in said enclosure can be fluidised and heat treated;
   (iv) transfer means *comprising a rotary screw conveyor including a shaft coaxial with said deck and having at least one vane comprising a helical flight, the helical flight being disposed adjacent the concave deck and being* disposed during fluidisation at least partially within the bed and operable to controlledly move said particles [continuously or stepwise] along said deck,
      said transfer means being adapted to control a dwell time of the particles in said enclosure while simultaneously improving conditions of fluidisation within the bed by substantially eliminating stagnant areas and reducing bubble formation; and
   (v) vibratory means operable to vibrate the deck with a component of vertical motion, whereby fluidisation of the particle bed is further enhanced.

3. An apparatus according to claim 2, wherein said concave deck is part-cylindrical and [said transfer means comprises a rotary element including a shaft coaxial with said deck, and further includes at least one] *said vane being* rotationally secure with said shaft, said vane being operable to act as said wall means.

4. An apparatus according to claim 3, wherein [said rotary element comprises a screw conveyor, said at least one vane comprising a helical flight,] the external diameter of said flight [being] *is* substantially equal to twice a radius of curvature of said deck, whereby, on rotation of said rotary element, the particles are transferred continuously along the deck.

8. A method of heat treating a particulate commodity, said method comprising the steps of:
   (i) supporting said commodity in a fluidised bed maintained above a concave perforate deck;
   (ii) supplying fluid under pressure to the bed through perforations in the deck at a controlled temperature whereby the bed is fluidised and the particulate commodity is heat treated;
   (iii) controlling the residence time of the particulate commodity in the bed by controlledly moving the particles along the deck [using transfer means disposed] *by rotating a rotary transfer means having a vane about an axis of rotation coaxial with the deck, with the vane disposed adjacent the deck and at least partially in the bed;*
   [(v)] *(iv)* vibrating the deck with a vertical component of vibratory motion; and
   (v) enchancing the conditions of fluidisation within the bed by substantially eliminating stagnant areas and reducing bubble formation using both said transfer means and said vibration of the deck.

*13. An apparatus for heat treating a particulate commodity, said apparatus comprising:*
   *(i) an enclosure defined in part by a lower wall comprising a concave perforate deck;*
   *(ii) supply means for supplying fluid under pressure through the perforate deck to said enclosure;*
   *(iii) temperature control means for controlling a temperature of said fluid supply under pressure through the perforate deck, whereby a bed of particles in said enclosure can be fluidised and heat treated;*
   *(iv) transfer means comprising a rotary element including a shaft coaxial with the deck and vanes rotationally secure with the shaft, said vanes of said rotary element comprising a plurality of substantially parallel discs extending radially from said axle, the radius of said discs being substantially equal to the radius of curvature of said deck, an aperture being disposed in the periphery of each said disc, said rotary element further comprising conveying means extending between at least one pair of adjacent discs to a location adjacent said aperture, whereby, on rotation of said rotary element, particles in said compartment between said adjacent discs are conveyed through said aperture, thus transferring the particles stepwise along the deck, the discs being disposed during fluidisation at least partially within the bed and operable to controlledly move said particles,*
      *said transfer means being adapted to control a dwell time of the particles in said enclosure while simultaneously improving conditions of fluidisation within the bed by substantially eliminating stagnant areas and reducing bubble formation; and*
   *(v) vibratory means operable to vibrate the deck with a component of vertical motion, whereby fluidisation of the particle bed is further enhanced.*

*14. An apparatus according to claim 13, wherein said discs comprise wall means moveable relative to said deck, said wall means being operable to compartmentalise said enclosure into compartments open towards said deck, whereby particles in each compartment can be substantially fully fluidised while the transfer means move the particles stepwise along the deck.*

* * * * *